United States Patent [19]
Calzone

[11] Patent Number: 5,462,249
[45] Date of Patent: Oct. 31, 1995

[54] CLAMP FOR SECURING TRAILER RAMP IN TRANSPORT POSITION

[76] Inventor: Ronald J. Calzone, HCR 60, Box 296, Dixon, Mo. 65459

[21] Appl. No.: 186,675

[22] Filed: Jan. 25, 1994

[51] Int. Cl.$^6$ ............................................. E01D 1/00
[52] U.S. Cl. .................. 248/316.7; 14/71.1; 248/231.41; 248/231.51; 292/58; 292/256.73
[58] Field of Search ................. 248/231.4, 231.1, 248/225.31, 316.1, 316.4, 500, 503, 506, 689, 222.1, 222.3; 14/69.5, 71.1, 71.3; 292/58, 59, 256.73, 256.75

[56] References Cited

U.S. PATENT DOCUMENTS

| | | | |
|---|---|---|---|
| 1,401,672 | 12/1921 | Claussen et al. | 248/231.4 X |
| 1,580,788 | 4/1926 | Lingard | 248/689 X |
| 2,206,775 | 7/1940 | Hoofer | 248/231.4 X |
| 2,670,232 | 2/1954 | Schmitz | 292/256.73 |
| 3,431,537 | 3/1969 | Klingenberg | 248/506 X |
| 4,020,957 | 5/1977 | Wren | 14/71.1 X |
| 4,084,713 | 4/1978 | Rohrs et al. | 14/69.5 X |
| 4,088,235 | 5/1978 | Thacker | 14/71.1 X |
| 4,413,848 | 11/1983 | Leaver et al. | 292/59 |
| 4,632,201 | 12/1986 | Kay | 248/503 X |
| 4,669,577 | 6/1987 | Werner | 248/231.4 X |
| 5,154,258 | 10/1992 | Krukow | 248/503 X |

*Primary Examiner*—Ramon O. Ramirez
*Assistant Examiner*—Derek J. Berger
*Attorney, Agent, or Firm*—Robbins & Robbins

[57] ABSTRACT

A pivotable clamp for securing a trailer ramp in a stowed position on the surface of a dovetail-type trailer is provided. The trailer and ramp on which the clamp is used are of the type having a surface constructed of spaced apart crosspieces. The clamp is comprised of an arm member and a pivot bar member. The arm member features a handled shaft member with a claw member at its end for engaging the edge of a crosspiece of the trailer surface. The arm member is rotatably received within a strap member of the pivot bar member. A spring and a tightening nut with handles are mounted on the shaft member for varying the degree of tightness with which the claw member engages the crosspiece. The pivot bar member allows the clamp to be swung in and out of position.

15 Claims, 4 Drawing Sheets

5,462,249

CLAMP FOR SECURING TRAILER RAMP IN TRANSPORT POSITION

BACKGROUND OF THE INVENTION

Heavy duty trailers of the type used for hauling large pieces of earth-moving equipment and the like typically, particularly dovetail trailers, have ramps to facilitate loading and unloading of the equipment. Many of such trailers have pivoting ramps which rest on the trailer when not in use, and swing back onto the ground into a loading position to enable equipment to be driven directly on to the trailer. Attention is directed toward my prior issued U.S. Pat. No. 5,145,310 disclosing a reverse spring assist for moving trailer ramps of this type between the loading and transport positions.

There exists the problem in that these ramps tend to rattle around during transport unless they are secured down to the trailer surface. Ropes and chains can be used, but since they are separate items, they can be mislaid or lost. Additionally, they do not lend themselves to quick connection and disconnection.

It would be desirable to provide a simple and efficient means for securing the ramps of heavy duty trailers in the stowed position, without the use of tools or surplus binding means.

SUMMARY OF THE INVENTION

By means of the instant invention there is provided a pivotable clamp for securing the ramps of heavy duty trailers in a stowed, swung back position on the top surface of said trailers. The clamp is comprised of an arm member and a pivot bar member which can swing in and out of position for clamping.

The arm member comprises an elongated shaft member having a handle member for rotating the arm member at one end and a claw member for engaging with and grabbing the trailer surface at the other end. The pivot bar member is comprised of a bracket to which a rigid strap member is pivotally connected. The shaft of the arm member is received transversely through an opening in the strap member. It is rotatable and slidable within the opening so that the handle may be turned and the shaft moved up and down.

The pivot bar member is connected to an underneath side of the ramp surface where it will not interfere during loading operations. When the ramp is swung back and placed on the trailer surface in the transport position, the clamp member can reach through gaps in the ramp and the trailer to secure the ramp onto the trailer surface. A spring is mounted on the shaft member and bears against a stop nut to place a resistant longitudinal pressure on the shaft member so that the claw member will be held in a biased relationship against the surface with which it engages.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWINGS

DESCRIPTION OF THE INVENTION

Figure 1:
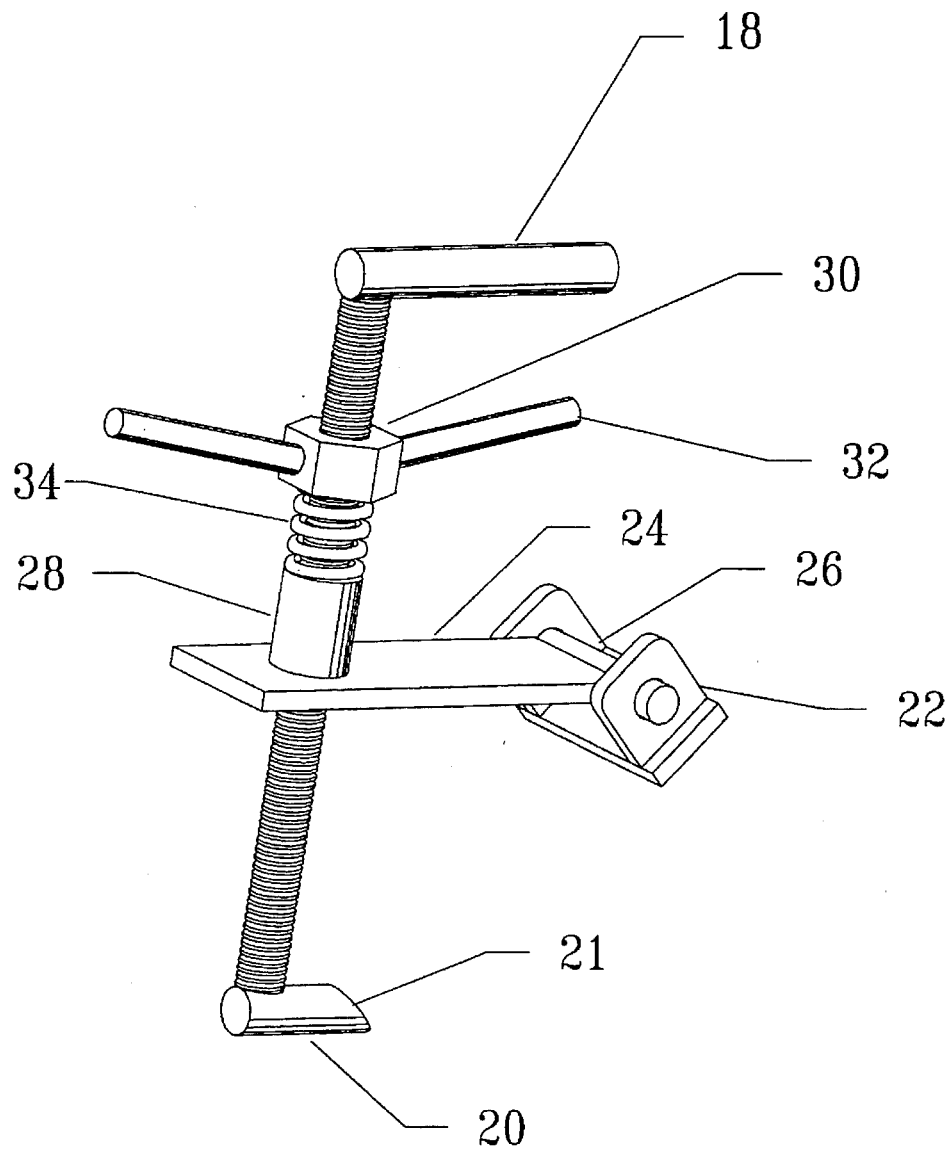
FIG. 1 is a perspective view of the clamp of the instant invention.

The clamp of the instant invention, shown generally by the reference numeral 10, is used for securing a trailer ramp in the transport position on a dovetail trailer surface. It is comprised of an arm member 12 and pivot bar member 14.

Arm member 12 comprises an elongated shaft member 16 having a handle member 18 at one end and a claw member 20 at the other end. Shaft 16 is best comprised of a rigid metal rod to which handle 18 and claw 20 are welded. Arm member 12 can likewise be cast as one integral piece. Handle 18 and claw 20 are in directional alignment on shaft 16 so that rotational movement effected to handle 18 will produce a like movement in claw 20.

Figure 3:
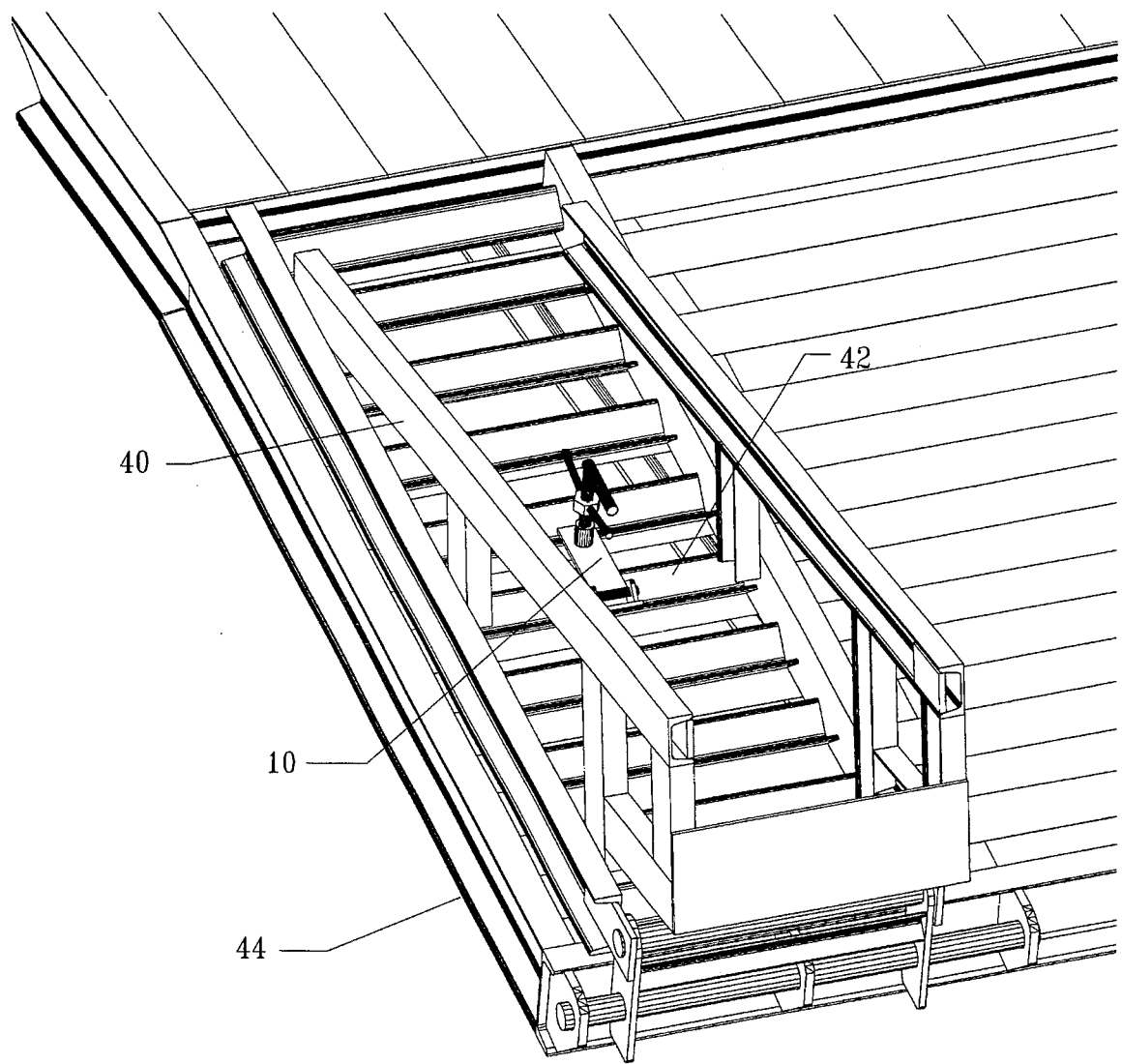
FIG. 3 is a perspective view of the ramp clamped to the trailer in the stowed or transport position.

Pivot bar member 14 is comprised of an anchor bracket 22 and strap member 24. Anchor bracket 22 is mounted by welding, bolting or the like to a crosspiece or rung 42 on an underneath side of ramp 40 as shown in FIG. 3. Strap member 24 is a rigid metal plate or the like connected in pivotal relationship to anchor bracket 22 by spindle 26. Strap 24 has a hole at its free end (not shown) for slidably receiving shaft 16 in perpendicular relationship. Thus arm member 12 may be completely rotated about its vertical axis and may slide up and down in the vertical plane within strap 24. For additional stability, collar 28 is welded on the surface of strap 24 to hold shaft 16 in vertical alignment and to prevent twisting and skewing when a load is placed on clamp 10. Its internal diameter is of a slightly greater dimension than the external diameter of shaft 16 so that shaft 16 may slide freely therethrough.

A stop member must be provided to prevent longitudinal loosening of arm member 12 as it clamps the ramp down on the trailer surface. Shaft 16 has a threaded surface to receive stop member 30 which can be a threaded nut as shown in FIG. 1. Other stop member means may include a concentric clamp or the like, if shaft 16 is not threaded, as long as it can prevent longitudinal movement of shaft 16 within strap 24. Threaded stop nut 30 is provided with at least one radial lug 32 for use in loosening or tightening to easily change the placement of the stop nut. Spring member 34 is placed on shaft 16 between nut 32 and strap 24 to effect a biasing force on claw member 20 toward strap 24. Spring 34 can either engage the top edge of collar 28 or pass over it to engage strap 24. Stop member 30 and spring member 34 are placed on shaft 16 prior to attachment of handle 18.

USE

Figure 2:
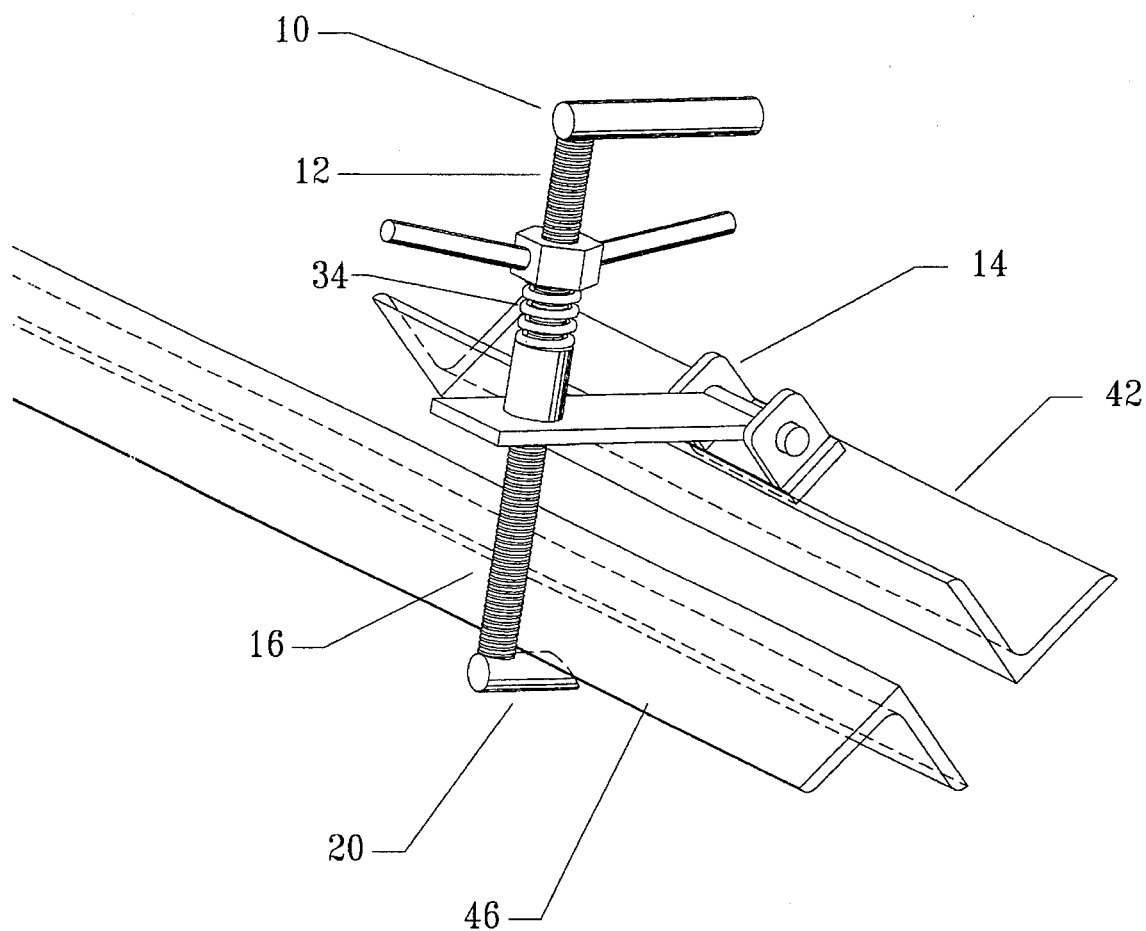
FIG. 2 is a perspective view of the clamp focusing on the area of engagement of the ramp to the trailer surface by means of the clamp.

The clamp of the instant invention is very simply employed on dovetail-type trailers for tightly securing the pivotable ramps down on the trailer surface while in the transport position as shown in FIG. 3. Its structure provides ready installation as an aftermarket piece of equipment. Anchor bracket 22 of clamp 10 is mounted on the underneath side of ramp 40 along any one of the cross-pieces 42. Strap member 24 is pivoted so that shaft 16 depends down between the cross pieces of ramp 40 and trailer 44. Not all trailers, however, are comprised of spaced apart crosspieces. It is to be understood, nevertheless, that for trailers having a solid deck, slots must be provided to allow shaft 16 to span the ramp surface and the trailer surface to provide the same clamping effect. Handle 18 is rotated to bring claw 20 into engagement with cross-piece 46 of the trailer surface, as shown in FIG. 2, while strap 24 engages cross-piece 42 of the ramp. A tight clamping relationship is effected as spring 34 engages stop nut 30 which urges shaft 16 in longitudinal movement in a direction toward handle 18 and away from strap 24. This in turn brings claw 20 into biased relationship against cross-piece 46 of the trailer surface.

A tighter clamping action can be effected by placing a greater load on spring member 34. Stop nut 30 can be moved along the threaded surface of shaft 16 to a point closer to strap 24 so that the stress placed on spring 34 can be increased as claw 20 is brought into engagement with cross-piece 46. Claw 20 has a bevelled face edge 21 to facilitate contact and engagement with cross-piece 46 when the stress is increased. Tightening of the spring can be done either before or after the clamp is engaged. Radial lugs 32 facilitate tightening of the stop nut 30 which can be difficult after claw 20 engages cross-piece 46.

Figure 4:
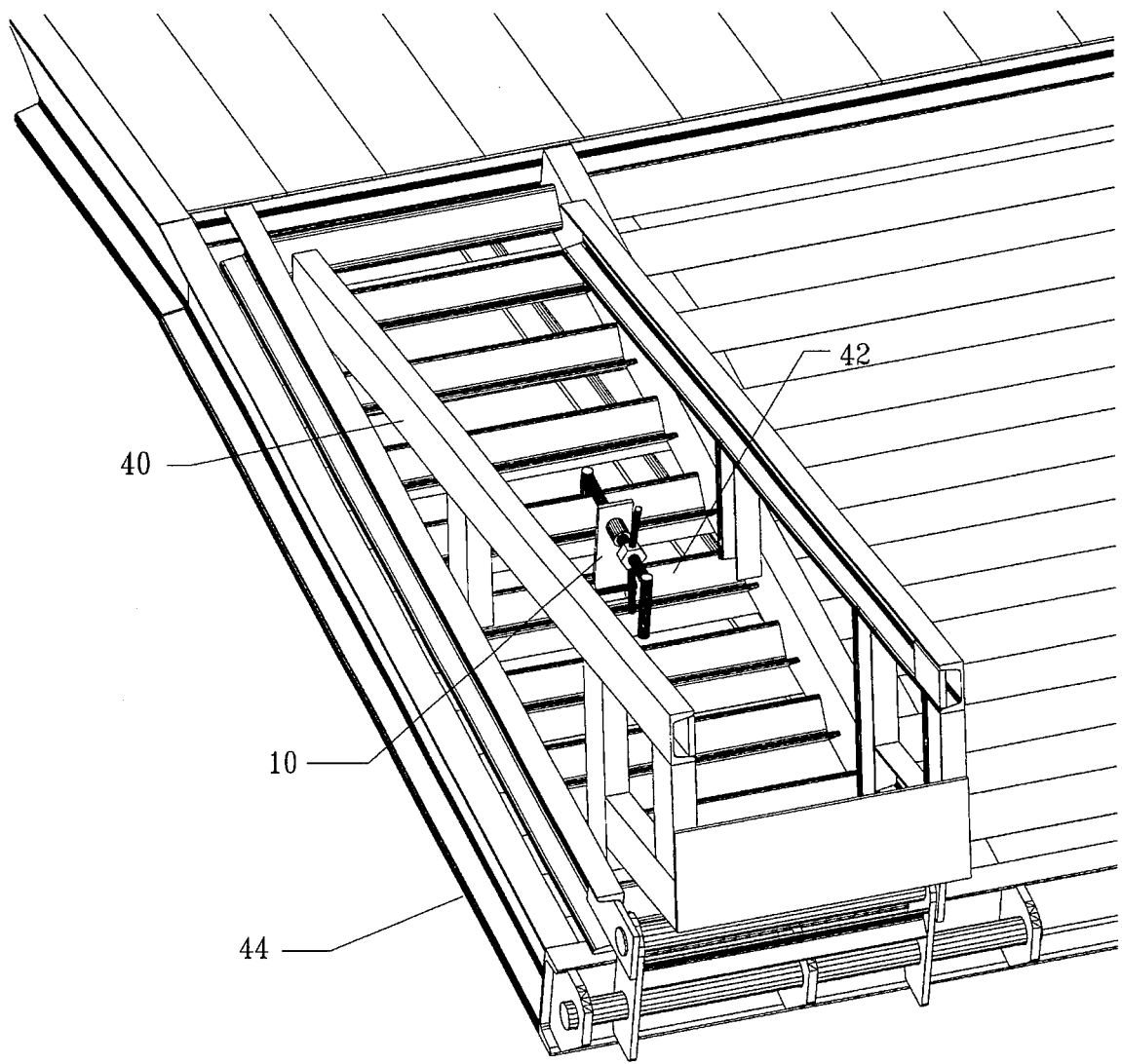
FIG. 4 is a perspective view of the ramp on the trailer with the clamp disengaged and pivoted out of the way.

When the ramp is to be moved into loading position, handle 18 is simply turned to remove claw 20 from engagement with cross-piece 46 thus releasing the clamp. Strap 24 can then be pivoted to swing the clamp out of the way as shown in FIG. 4. The ramp can then be pivoted away from the trailer surface and onto the ground. Shaft 16 can slide down so that claw 20 can be moved below and away from cross-piece 42 of the ramp so as to not interfere with loading operations. When not in use, and the ramp is in the loading position, the clamp can be allowed to just dangle unobtrusively below the ramp.

The clamp of the instant invention thus provides a means by which ramps can be quickly and easily secured onto the surface of dovetail-type trailers without the need for extraneous ropes or chains, and requires no other tools. The spring and stop means ensure a secure clamp and allow an operator to tighten the clamp after engagement. When not in use, the clamp can be conveniently moved out of the way to prevent interference with the loading operation.

Various changes and modifications may be made within this invention as will be apparent to those skilled in the art. Such changes and modifications are within the scope and teaching of this invention as defined in the claims appended hereto.

What is claimed is:

1. A pivotable clamp for securing a first member against a second member in an adjacent planar membership, said clamp comprising an arm member and a pivot bar member, said arm member comprising an elongated shaft member having a handle member at one end thereof, and a claw member at a second end thereof, said pivot bar member comprising an anchor bracket and a strap member pivotally connected to said anchor bracket, said anchor bracket having means for connection to a surface of said first member, said strap member having an opening to transversely receive said shaft member in a rotating relationship, whereby said claw member is rotatably movable in relation to rotation of said handle member, said claw member having means for bearing against said second member to secure said first and second members together, means being provided to brace said shaft member against passive loosening movement.

2. The clamp of claim 1 in which a collar is mounted on said strap member about said opening to receive and support said elongated shaft member.

3. The clamp of claim 1 in which a spring member is mounted on said shaft member between said handle member and said strap member, and a stop means is mounted on said shaft member between said handle member and said spring member, said spring member bearing against said stop means in biased relationship whereby a resultant resistant pressure urges said claw member against said second member in biased relationship.

4. The clamp of claim 3 in which said shaft member is threaded, and said stop means comprises a threaded nut member, whereby the degree to which said spring is loaded is variable.

5. The clamp of claim 4 in which said nut member has at least one radial lug member for gripping while turning said nut member.

6. The clamp of claim 1 in which a collar is mounted on said strap member about said opening to receive and support said elongated shaft member, a spring member is mounted on said shaft member between said handle member and said strap member, said shaft member being threaded, with a threaded nut member being provided on said shaft member between said handle member and said spring member, said spring member bearing against said nut member in biased relationship whereby a resultant resistent pressure urges said claw member against said second member in biased relationship, said nut member having at least one radial lug member for gripping while turning said nut member, whereby the degree to which said spring is loaded is variable.

7. A trailer with ramp and pivotable clamp for securing said ramp to said trailer in a stowed position, said ramp being pivotally connected to said trailer such that said ramp pivots between a loading position off of said trailer and said stowed position on a top surface of said trailer, said clamp comprising an arm member and a pivot bar member, said arm member comprising an elongated shaft member having a handle member at one end thereof, and a claw member at a second end thereof, said pivot bar member comprising an anchor bracket and a strap member pivotally connected to said anchor bracket, said anchor bracket having means for connection to an underneath side of a surface of said ramp, said strap member having an opening to transversely receive said shaft member in a rotating relationship, whereby said claw member is rotatably movable in relation to rotation of said handle member, said shaft member being of sufficient length to transversely pass across said trailer ramp surface and said trailer surface while said ramp is in said stowed position, said claw member being able to bear against an edge of said trailer surface, means being provided to brace said shaft member against passive loosening movement, whereby said ramp is secured to said trailer surface.

8. The trailer of claim 7 in which a collar is mounted on said strap member about said opening to receive and support said elongated shaft member.

9. The trailer of claim 7 in which a spring member is mounted on said shaft member between said handle member and said strap member, and a stop means is mounted on said shaft member between said handle member and said spring member, said spring member bearing against said stop means in biased relationship whereby a resultant resistant pressure urges said claw member against said edge of said trailer surface in biased relationship.

10. The trailer of claim 9 in which said shaft member is threaded, and said stop means comprises a threaded nut member, whereby the degree to which said spring is loaded is variable.

11. The trailer of claim 10 in which said nut member has at least one radial lug member for gripping while turning said nut member.

12. The trailer of claim 7 in which a collar is mounted on said strap member about said opening to receive and support said elongated shaft member, a spring member is mounted on said shaft member between said handle member and said strap member, said shaft member being threaded, with a threaded nut member being provided on said shaft member between said handle member and said spring member, said spring member bearing against said nut member in biased relationship whereby said claw member engages said edge of said trailer surface, said nut member having at least one radial lug member for gripping while turning said nut member, whereby the degree to which said spring is loaded is variable.

13. The trailer of claim 7 in which means are provided in said surfaces of said trailer and said ramp, whereby said shaft member of said clamp passes transversely through an interior planar region of said surfaces.

14. The trailer of claim 13 in which said surfaces of said trailer and said ramp are comprised of cross piece members, said cross piece members being disposed in spaced apart parallel relationship.

15. The trailer of claim 13 in which said clamp pivots to a depending position below said ramp surface when said ramp is pivoted to said loading position.

\* \* \* \* \*